No. 888,766. PATENTED MAY 26, 1908.
F. STOCKER.
WASHING APPARATUS.
APPLICATION FILED FEB. 6, 1908.
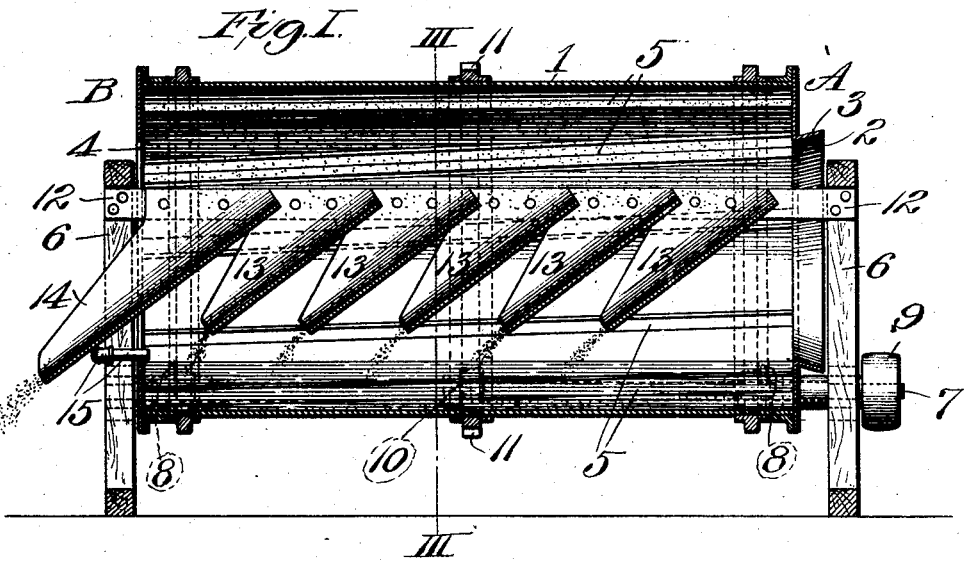
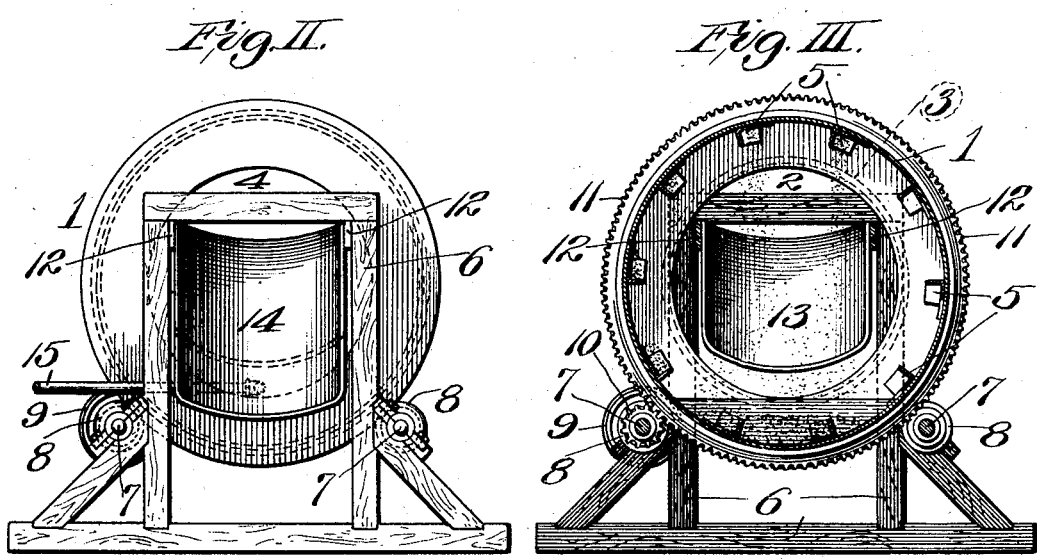

UNITED STATES PATENT OFFICE.

FREDRICH STOCKER, OF HIGHLAND, ILLINOIS.

WASHING APPARATUS.

No. 888,766.  Specification of Letters Patent.  Patented May 26, 1908.

Application filed February 6, 1908. Serial No. 414,584.

*To all whom it may concern:*

Be it known that I, FREDRICH STOCKER, a citizen of the United States of America, residing at Highland, in the county of Madison and State of Illinois, have invented certain new and useful Improvements in Washing Apparatus, of which the following is a full, clear, and exact description, reference being had to the accompanying drawing, forming part of this specification.

My invention relates to an apparatus for use in washing sand and other materials.

Figure I is a vertical longitudinal section taken through my apparatus. Fig. II is an end elevation looking at the delivery end of the apparatus. Fig. III is a vertical cross section taken on li. III—III, Fig. I.

In the accompanying drawings: 1 designates a revoluble drum that is provided at its receiving head or end A with an inlet opening 2 preferably surrounded by an annular flaring flange 3. The drum also has at its delivery head or end B, an outlet opening 4. Within the drum and extending longitudinally thereof are angular flights 5 that are inclined from the receiving end of the drum to the delivery end of the drum and relative to its axis.

6 designates end frames located in juxtaposition to the heads or ends of the drum and which serve as supports for bearing boxes in which are mounted shafts 7 on which are arranged rollers 8 serving as supports on which the drum 1 turns. One of the shafts 7 has fixed to it a drive pulley or wheel 9 to which power may be transmitted, and also a pinion 10 that meshes with a cylindrical rack 11 fixed to the drum to provide for the rotation of said drum.

12 designates a pair of supporting bars that are fixed at their ends to the end frames 6 and extend longitudinally through the drum 1.

13 are receiving chutes of broad scoop shape and of which there is a series, attached to the supporting bars 12 within the drum and inclined forwardly toward the delivery end of the drum. The lower free ends of these chutes terminate above the bottom of the drum so that said drum may revolve freely around the chutes. 14 is a discharge chute of broad scoop shape that is supported by the supporting bars 12 in front of the most forward chute 13, and which extends through the outlet opening 4 of the drum.

In the practical use of my washing apparatus, the sand or other material to be washed is introduced into the drum 1, through its inlet opening in any suitable manner, such as by shoveling it through said opening or extending a conveying chute through the opening, and water is conducted into the drum at its delivery end through a pipe 15, (see Figs. I and II). The drum being set in motion, the material placed therein is elevated by the angular flights 5 at the interior of the drum and when the material is carried to a position above the rearmost chute 13, it descends into said chute and moves forwardly therein, due to the inclination of the chute, to fall at the bottom of the drum at a point nearer the delivery end than that at which it was elevated. The material is again picked up by the flights and emptied into the next succeeding chute 13 to move forwardly as it descends from said chute, and this action is continued throughout the extent of the drum until the material is finally discharged from the apparatus through the delivery chute 14. Due to the flights 5 being inclined as mentioned, the material is in part carried forwardly by said flights and is prevented from moving backwardly in the drum along the flights. The water being delivered into the drum at its delivery end supplies all of the needs for the washing of the material while it is being conducted through the apparatus and further provides for the discharge of dirty water through the receiving end of the apparatus over the annular flaring flange at which the material is introduced, so that the water at the delivery end is kept in a much cleaner condition than it would be, if the water were introduced at the receiving end.

I claim:

A washing apparatus comprising end frames, a pair of longitudinal supporting bars fixed at their ends to the end frames, a series of inclined broad scoop-shaped chutes secured to and depending from the supporting bars, an inclined broad scoop-shaped chute secured to and depending from the supporting bars, and projecting through the forward end frame, bearing boxes secured to the end frames, shafts having supporting rollers and mounted in the bearing boxes, a drum having end openings, and angular forwardly extending flights extending from end to end of the drum; the drum being mounted on the rollers and surrounding the chutes.

FREDRICH STOCKER.

In the presence of—
HY. F. WESSEL, Jr.,
ALFRED SIEGRIST.